United States Patent
Subraya

(10) Patent No.: US 10,606,516 B2
(45) Date of Patent: Mar. 31, 2020

(54) SYSTEMS AND METHODS FOR I/O PRIORITIZATION IN NVME-COMPLIANT STORAGE DEVICES

(71) Applicant: HEWLETT PACKARD ENTERPRISE DEVELOPMENT LP, Houston, TX (US)

(72) Inventor: Sumangala Bannur Subraya, Bangalore (IN)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 24 days.

(21) Appl. No.: 16/102,633

(22) Filed: Aug. 13, 2018

(65) Prior Publication Data

US 2020/0042236 A1 Feb. 6, 2020

(30) Foreign Application Priority Data

Aug. 1, 2018 (IN) .............................. 201841029015

(51) Int. Cl.
| | | |
|---|---|---|
| *G06F 12/00* | (2006.01) | |
| *G06F 3/06* | (2006.01) | |
| *G06F 13/18* | (2006.01) | |
| *G06F 13/16* | (2006.01) | |
| *G06F 12/02* | (2006.01) | |
| *G06F 9/455* | (2018.01) | |

(52) U.S. Cl.
CPC ............ *G06F 3/0659* (2013.01); *G06F 3/061* (2013.01); *G06F 3/0679* (2013.01); *G06F 9/455* (2013.01);
(Continued)

(58) Field of Classification Search
CPC ...... G06F 3/0659; G06F 3/061; G06F 3/0679; G06F 12/0246; G06F 13/1642;
(Continued)

(56) References Cited

U.S. PATENT DOCUMENTS

| 9,785,355 B2 | 10/2017 | Huang |
|---|---|---|
| 2015/0143134 A1 | 5/2015 | Hashimoto |

(Continued)

FOREIGN PATENT DOCUMENTS

CN 107885456 A 4/2018

OTHER PUBLICATIONS

Elsebø. K., "Improving Disk Performance in Vortex with NVMe," Jun. 2015, 84 pages, https://munin.uit.no/bitstream/handle/10037/7994/thesis.pdf?sequence=2.

(Continued)

*Primary Examiner* — Shawn X Gu
(74) *Attorney, Agent, or Firm* — Hewlett Packard Enterprise Patent Department

(57) ABSTRACT

Systems and methods disclosed herein provide an I/O prioritization scheme for NVMe-compliant storage devices. Through an interface of an HBA driver, a user specifies a range of LBAs that map to a namespace. The user interface also designates a priority level for the namespace. Once the namespace is created, the HBA driver generates a queue of the designated priority level. The HBA driver also generates a table that maps the queue to the namespace. When the HBA driver receives a request to perform an I/O command that targets the namespace, the HBA driver adds the requested command to the queue. I/O commands targeting the namespace are processed in accordance with the designated priority level by the controller.

20 Claims, 5 Drawing Sheets

(52) U.S. Cl.
CPC ...... *G06F 9/45533* (2013.01); *G06F 12/0246* (2013.01); *G06F 13/1642* (2013.01); *G06F 13/18* (2013.01); *G06F 2212/1024* (2013.01); *G06F 2212/7201* (2013.01)

(58) Field of Classification Search
CPC ............. G06F 13/18; G06F 2212/1024; G06F 2212/7201; G06F 9/455; G06F 9/45533
See application file for complete search history.

(56) References Cited

U.S. PATENT DOCUMENTS

| | | |
|---|---|---|
| 2015/0378606 A1 | 12/2015 | Huang |
| 2017/0285963 A1 | 10/2017 | Totolos et al. |
| 2018/0060228 A1* | 3/2018 | Arai ....................... G06F 3/0608 |
| 2018/0217951 A1* | 8/2018 | Benisty ............... G06F 13/1642 |

OTHER PUBLICATIONS

Lenny, T., "NVM Express: Unlock the Potential," 2014, 91 pages, https://www.flashmemorysummit.com/English/Collaterals/Proceedings/2014/20140805_A11_All.pdf.

Oracle Corporation, "Tuning I/O," 1999, 45 pages, https://docs.oracle.com/cd/A81042_01/DOC/server.816/a76992/ch20_io.htm.

Extended European Search Report received for EP Patent Application No. 19187848.7, dated Nov. 25, 2019, 10 pages.

* cited by examiner

SYSTEMS AND METHODS FOR I/O PRIORITIZATION IN NVME-COMPLIANT STORAGE DEVICES

BACKGROUND

Non-Volatile Memory Express (NVMe) is an interface to flash devices. Devices that are compliant with the NVMe specification have very low latency and high bandwidth compared to traditional hard drives. The NVMe specification is an open device interface specification that specifies how host software and hardware communicates with non-volatile memory subsystems (e.g., NAND flash memory in SSDs). Compared to prior interface protocols, NVMe reduces Input/Output (I/O) overhead, facilitates parallelization, and reduces latency.

BRIEF DESCRIPTION OF THE DRAWINGS

Various features and advantages of the invention will become apparent from the following description, given by way of example only, which is made with reference to the accompanying drawings.

DETAILED DESCRIPTION

The current NVMe specification (e.g., NVM Express Revision 1.3) allows submission queues that hold requested I/O commands to have different priority levels (e.g., low, medium, or high). The NVMe specification also describes arbitration mechanisms for deciding the order in which to execute the I/O commands contained in a group of queues. However, the current NVMe specification lacks a mechanism for specifying the priority for an I/O command within the command itself. As a result, I/O commands may be routed to queues whose priority levels do not align with the desired performance levels of the software that requests that those I/O commands be performed.

For example, a system administrator may wish for I/O commands for a virtual machine that primarily monitors the thermal states of hardware components to take have a higher priority than I/O commands that originate from an Internet browser. However, since the current standard does not specify a way to identify priority levels for I/O commands, some I/O commands for the virtual machine for the virtual machine may be routed to queues with medium or low priority levels. Also, some I/O commands that originate from the browser may be routed to queues with high priority levels. As a result, some urgent I/O commands in low-priority queues may be unduly delayed while less urgent I/O commands in high-priority queues are executed.

Systems and methods disclosed herein address this problem by leveraging namespaces (which are supported in the current NVMe standard). Through a user interface of an HBA driver, a user can specify a range of logical block addresses (LBAs) that map to a namespace. The namespace, in turn, may map to a virtual machine or to some other construct that is of interest to the user. The user interface also allows the user to designate a priority level for the namespace. Once the namespace is created, the HBA driver generates at least one queue of the designated priority level. The HBA driver also generates a table that maps the queue to the namespace. When the HBA driver receives a request to perform an I/O command that targets the namespace (i.e., the specified range of LBAs), the HBA driver routes the I/O command to the queue. Since the queue has the designated priority level, the net result is that I/O commands for the construct to which the namespace maps are processed in accordance with the designated priority level.

Figure 1:
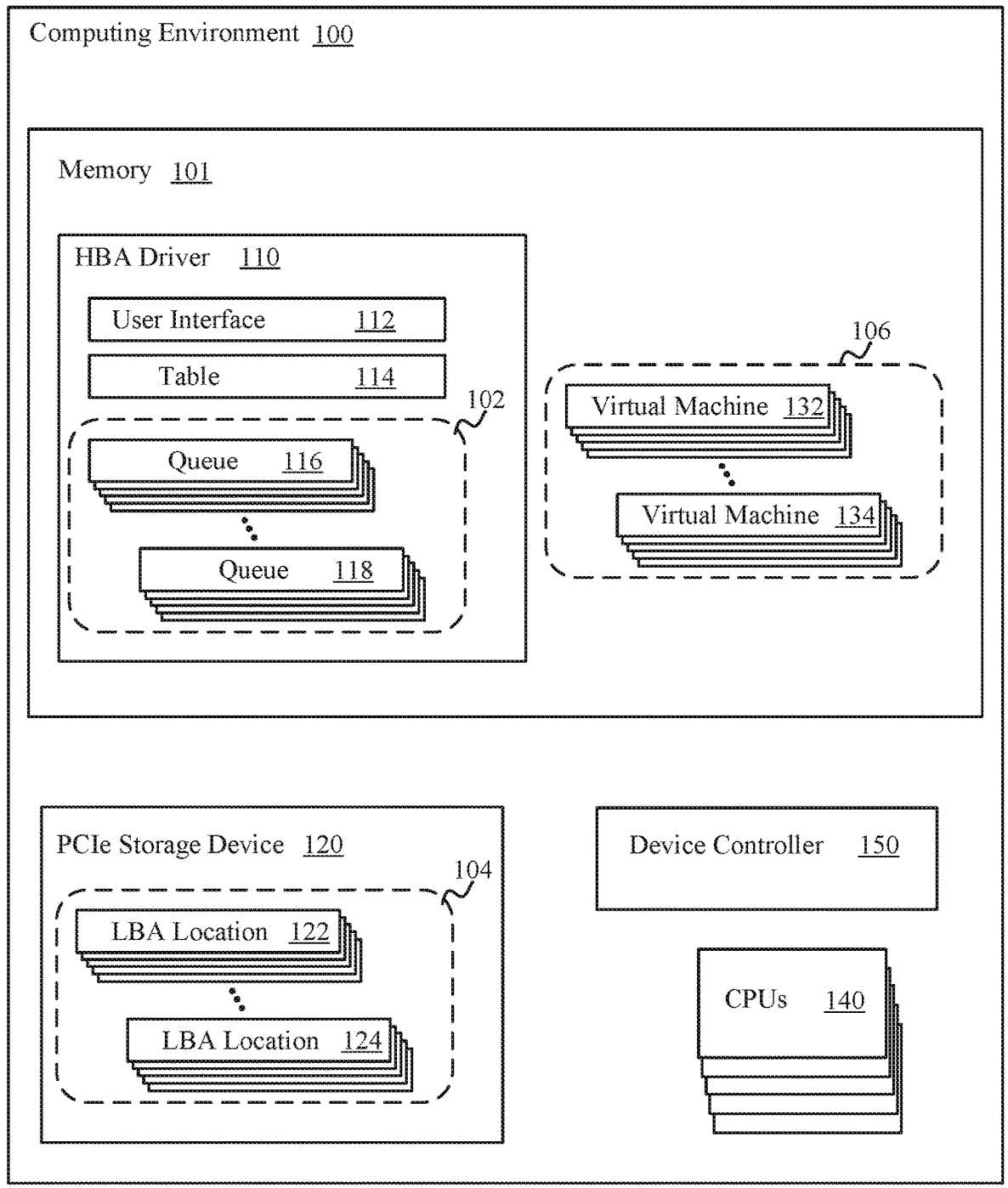
FIG. 1 illustrates computer environment in which technologies described herein may operate, according to one example.

FIG. 1 illustrates computer environment 100 in which technologies described herein may operate, according to one example. The computing environment 100 may be, for example, a high-end server or a collection of servers (e.g., in a cloud infrastructure). As shown, the computing environment 100 includes memory 101, one or more central processing units (CPUs) 140, a PCIe storage device 120, and a device controller 150. An HBA driver 110 executing in the memory 101 manages communications between the PCIe storage device 120 and other elements of the computing environment, such as the CPUs 140. The PCIe storage device 120 and the HBA driver may conform to a current NVMe standard (e.g., NVM Express Revision 1.3 or a later revision).

Logical block addresses (LBAs) 104 index specific storage locations within the PCIe storage device 120. Virtual machines 106 also execute in the memory 101. Each of the virtual machines 106 runs an instance of an operating system and comprises a set of specification files and configuration files. The virtual machines 106 may also run applications.

A user (e.g., a system administrator) may wish for the HBA driver 110 to prioritize I/O commands for virtual machine 132 to be given priority over I/O commands for virtual machine 134. Such a scenario may arise, for example, if virtual machine 132 handles direct files database files for a database, while virtual machine 134 handles only temporary files for that same database.

Through the user interface 112, the user can configure the HBA driver 110 to prioritize I/O commands for the virtual machine 132 over I/O commands for the virtual machine 134 in the following manner. First, the user provides a unique identifier for a namespace for the virtual machine 132 or, alternatively, signals the HBA driver 110 to generate a unique identifier for the namespace. (Note that, in some examples, an operating-system-level partition may be used as the namespace.) Next, the user specifies at least one range of LBA locations that are assigned to the namespace for the virtual machine 132. The range includes LBA location 122.

Next, the user selects a priority level of "high" for the namespace. In this example, the user specifies that a single priority level applies to all I/O commands that target LBA locations in the namespace. However, in other examples, the user may designate different priority levels for different types of I/O commands that target LBA locations in the namespace. For example, the user can specify that read commands targeting the namespace have a "high" priority level and write commands have a "medium" priority level (or vice versa).

In addition, the user can specify a number of submission queues for the HBA driver 110 to assign to the namespace. Depending on the expected rate at which the HBA Driver 110 will receive I/O requests targeting the namespace, one submission queue (and a corresponding completion queue) is generally sufficient. However, the number of queues per namespace is user configurable. Currently, NVMe includes support for up to 65,535 queues in total. Each submission queue may hold up to a Maximum Queue Entries Supported (MQES) by the device controller 150 for the PCIe storage device 120. Also, the user can provide a textual description or other metadata for the namespace via the user interface 112.

Next, the user can define a namespace for virtual machine 134 in a similar fashion. However, since the user wishes to prioritize I/O commands for the virtual machine 132 over I/O commands for the virtual machine 134, the user selects a priority level of "low" (or "medium") for the namespace for virtual machine 134. While the use case explained with respect to FIG. 1 involves namespaces that map to virtual machines, namespaces may also map to applications that run directly on a host in the computing environment 100.

Once the namespace for the virtual machine 132 and the namespace for the virtual machine 134 have been defined via the user interface 112, the HBA driver 110 creates the queues 102. The queues 102 include submission queues and completion queues that are paired with each other (i.e., for each submission queue, there is a corresponding completion queue). The HBA driver also generates a table 114. One entry in the table maps submission queue 116 to the namespace for virtual machine 132 and specifies that the priority level for submission queue 116 is "high." Another entry in the table 114 maps submission queue 118 to the namespace for virtual machine 134 and specifies that the priority level for submission queue 118 is "low."

Once the table 114 has been generated, the HBA driver 110 can operate in the following manner. When a request to perform an I/O command is received at the HBA driver 110, the HBA driver 110 identifies an LBA indicated by the request (e.g., an LBA to be read or upon which to be written). In this example, suppose the request indicates that the I/O command is to be performed upon LBA location 122. The HBA driver 110, upon determining that LBA location 122 is assigned to the namespace for the virtual machine 132, performs a lookup operation on the table 114 and determines that queue 116 maps to the namespace for the virtual machine 132. Accordingly, the HBA driver 110 adds the requested I/O command to queue 116.

Similarly, the HBA driver 110 may receive an additional request to perform an additional I/O command. After determining that the LBA location 124 is indicated by the request and maps to the namespace for virtual machine 134, the HBA driver 110 performs another lookup operation on the table 114 and determines that the queue 118 maps to the namespace for virtual machine 134. Accordingly, the HBA driver 110 adds the additional I/O command to queue 118.

Once the requested I/O commands have been added to queue 116 and queue 118, respectively, the device controller 150 applies an arbitration mechanism to determine the order in which to execute the I/O commands in the queues 102. There are a number of different arbitration mechanisms described in by NVMe, such as round robin, weighted round robin with urgent priority class arbitration, or a vendor-specific arbitration mechanism (e.g., as described in greater detail in NVM Express Revision 1.3). If the device controller applies the round robin arbitration mechanism and there are I/O commands in both queue 116 and queue 118, all the commands in queue 116 will be executed before any of the commands in queue 118 because queue 116 has a higher priority level than queue 118.

In this manner, the HBA driver 110 can route I/O commands into the queues 102 according to the priority levels for the namespaces (and the corresponding virtual machines 106) to which the I/O commands pertain. This ensures that I/O commands are routed into queues that reflect the prioritization scheme that the user wishes to implement.

Also, if the user wishes to change any characteristics of the namespaces after the namespaces have already been defined, the user can update the priority levels, LBA ranges, and numbers of submission queues for the namespaces via the user interface 112. Once such a change is made, the HBA driver 110 also updates the table 114 to reflect the changes.

In some scenarios, an I/O request that targets a particular namespace may be received while each predefined queue that maps to that namespace is already full (e.g., with a number of command entries equal to the MQES). When the HBA driver 110 detects such a scenario, the HBA driver 110 may generate a supplementary queue that maps to that namespace and assign the same priority level associated with the predefined queues for that namespace to the supplementary queue. Also, the HBA driver 110 adds an entry for the supplementary queue to the table 114. In addition, the HBA driver 110 can also throttle I/O requests that are directed to medium-priority queues or low-priority queues. That may free up resources on the controller side, and those freed resources can then be used to service the newly created supplementary queue. Later, when the HBA driver 110 detects that sufficient space is available in the predefined queues, the HBA driver 110 may move any remaining entries found in the supplementary queue over to the predefined queues and delete the entry for the supplementary queue from the table 114.

While the FIG. 1 illustrates an example in which a user maps namespaces to virtual machines, a user may choose to map namespaces to other types of constructs without departing from the spirit and scope of this disclosure. For example, a user could choose to define namespaces that map to applications, data repositories, or some other type of construct.

Figure 2:
FIG. 2 illustrates an example of a table that may be used by a host bus adapter (HBA) driver to identify queues associated with namespaces and priority levels that apply to those queues, according to one example.

FIG. 2 illustrates an example of a table 200 that may be used by an HBA driver to identify queues associated with namespaces and priority levels that apply to those queues, according to one example.

As shown, the table 200 includes columns with the headers "Namespace ID," "I/O Command type(s)," "Queue ID," and "Priority level" in a header row 202. Each of the rows 204-216 is an entry that maps a queue IDs to a namespace IDs and a priority level.

For example, as shown in row 204, the queue ID "312" maps to the namespace ID "VM_4U2C" and the priority level "high." Similarly, as shown in row 206, the queue ID "322" maps to the namespace ID "VM_I8AB" and the priority level "Medium." The HBA driver will place I/O commands that target the namespace "VM_4U2C" into the queue with the ID "312," while the HBA driver will place I/O commands that target the namespace "VM_I8AB" into the queue with the ID "322." As a result, I/O commands that target the namespace "VM_4U2C" will have a "High" priority and I/O commands that target the namespace "VM_I8AB" will have "Medium" priority. For example, if "VM_4U2C" maps to a first virtual machine and "VM_I8AB" maps to a second virtual machine, I/O commands for the first virtual machine will take priority over I/O commands for the second virtual machine.

Row 208 and row 210 indicate that both the queue ID "314" and the queue ID "324" map to the namespace ID "VM_2WAB." However, row 208 also indicates that the queue with the ID "312" has a "high" priority and maps only to the "Read" I/O command type. By contrast, row 210 indicates that the queue with the ID "324" has "Medium" priority and maps only to the "Write" I/O command type. The HBA driver will place read commands that target the namespace "VM_2WAB" into the queue with the ID "314," while the HBA driver will place write commands that target the namespace "VM_2WAB" into the queue with the ID "324." As a result, read commands that target the namespace "VM_2WAB" will have a "High" priority and write commands that target the namespace "VM_2WAB" will have "Medium" priority.

Row 212 indicates that the queue ID "326" maps to the namespace ID "AANHP5T" and the priority level "Medium." Thus, the HBA driver will place both read commands and write commands that target the namespace "AANHP5T" into the queue with the ID "326."

Row 214 and row 216 indicate that both the queue ID "332" and the queue ID "334" map to the namespace ID "CUL8R23." In addition, row 214 and row 216 indicate that both the queue ID "332" and the queue ID "334" map to read/write commands and have priority levels of "Low." Hence, the HBA driver will place I/O commands that target the namespace "CUL8R23" into both the queue with the ID "332" and the queue with the ID "334." Upon receiving a request to perform an I/O command that targets the namespace "CUL8R23," the HBA driver may add the requested command to one of these two queues at random or according to a predefined arbitration scheme (e.g., round robin). It may be helpful to have multiple queues that have the same priority level for that same types of commands map to the same namespace in this manner. For example, if a user anticipates that the HBA driver will receive command requests that target the namespace at an expected rate (e.g., measured in commands requested per a unit of time, such as milliseconds), it may be helpful to allocate a number of queues for the namespace in proportion to the expected rate.

While FIG. 2 is provided as an illustrative example, the content, size, format, the data structure used to implement a table (e.g., to enable lookup functionality), and other aspects of a table used by an HBA driver may vary without departing from the spirit and scope of the disclosure. For example, the table may include more columns or fewer columns in any order, while the number of entries in the table and the format of those entries may vary.

Figure 3:
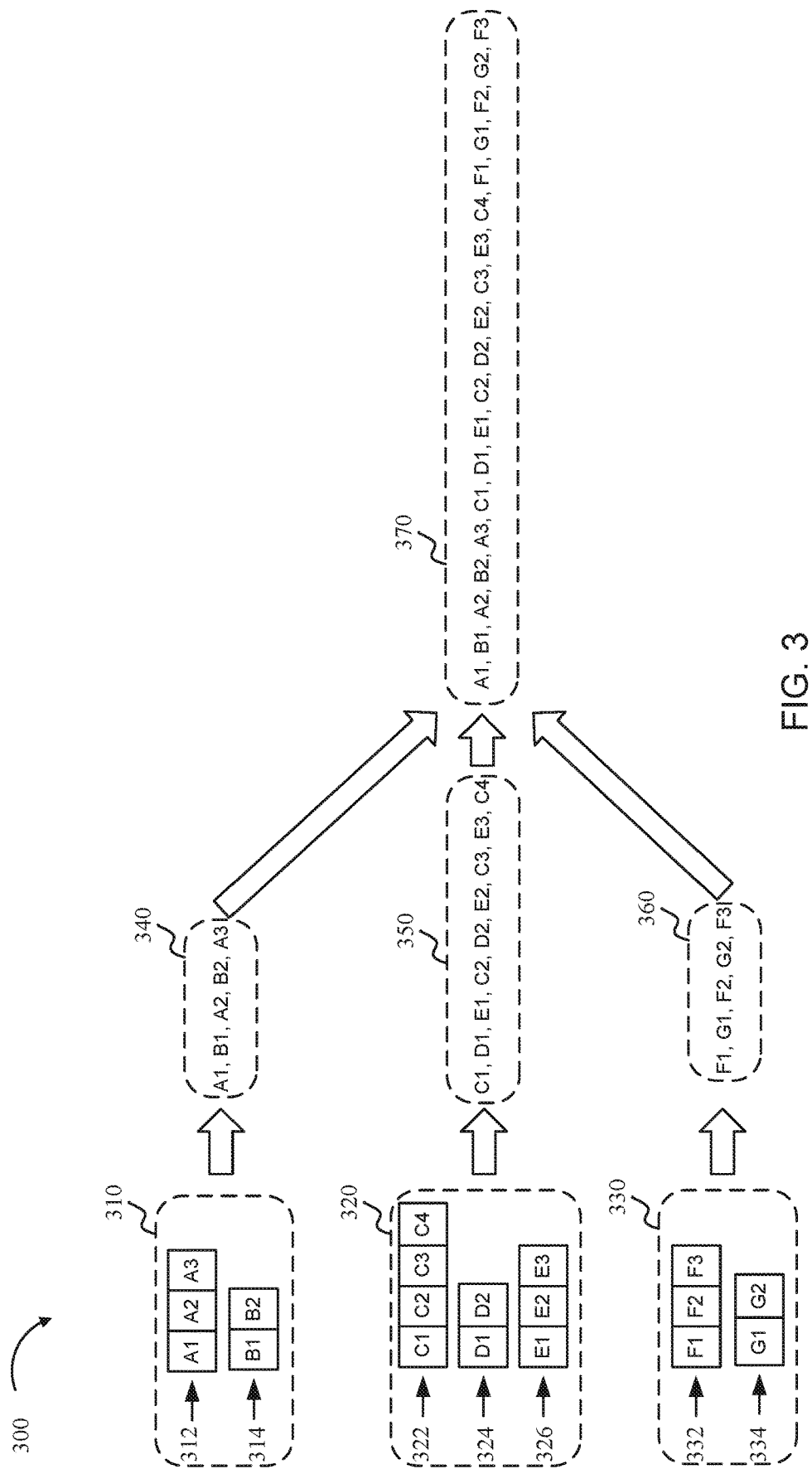
FIG. 3 illustrates a diagram that shows one way that an HBA driver may prioritize and execute I/O commands in found in queues that map to namespaces, according to one example.

FIG. 3 illustrates a diagram 300 that shows one way that an HBA driver may prioritize and execute I/O commands found in queues that map to namespaces, according to one example. While FIG. 3 provides one example of how the HBA driver may behave in one example scenario while applying a particular arbitration mechanism, persons of skill in the art will recognize that the scope of this disclosure is not limited thereby. The number of entries in each queue, the number of queues to which a particular priority level applies, the arbitration mechanism used, and other details may vary without departing from the spirit and scope of this disclosure.

Selection 310 includes queues that are assigned a "high" priority level. Thus, both queue 312 and queue 314 are high-priority submission queues. In this example, queue 312 includes I/O commands A1, A2, and A3. Queue 314 includes commands B1 and B2. The leftmost command in each queue shown in FIG. 3 is the first command in that queue.

Selection 320 includes queues that are assigned a "medium" priority level. Thus, queue 322, queue 324, and queue 326 are medium-priority submission queues. In this example, queue 322 includes I/O commands C1, C2, C3, and C4. Queue 324 includes commands D1 and D2. Queue 326 includes commands E1, E2, and E3.

Selection 330 includes queues that are assigned a "low" priority level. Thus, both queue 332 and queue 334 are low-priority submission queues. In this example, queue 332 includes I/O commands F1, F2, and F3. Queue 334 includes commands G1 and G2.

In this example, the HBA driver is configured to execute the commands found in the high-priority queues before executing any of the commands in the medium-priority or low-priority queues. Accordingly, the HBA driver applies a round robin arbitration mechanism to queue 312 and 314. As a result, the HBA driver executes the commands found in selection 310 in the order (i.e., permutation) shown in selection 340.

Next, the HBA driver proceeds to the commands found in selection 320. In this example, the HBA driver is configured to execute the commands found in the medium-priority queues before executing any of the commands in the low-priority queues. Accordingly, the HBA driver applies the round robin arbitration mechanism to queue 322, queue 324, and queue 326. As a result, the HBA driver executes the commands found in selection 320 in the order shown in selection 350.

Once the commands found in the high-priority queues and the medium-priority queues have been executed, the HBA driver apples the round robin arbitration mechanism to queue 332 and queue 334. As a result, the HBA driver executes the commands found in selection 330 in the order shown in selection 360. Thus, the HBA driver executes the commands collectively included in selection 310, selection 320, and selection 330 in the order shown in selection 370.

The queues shown in FIG. 3 map to user-defined namespaces (e.g., as indicated by the table 200 shown in FIG. 2) and the namespaces map to virtual machines (or other constructs). Thus, the order shown in selection 370 demonstrates how the HBA driver can prioritize I/O commands based on the namespaces and based on the virtual machines (or other constructs) those namespaces represent.

Figure 4:
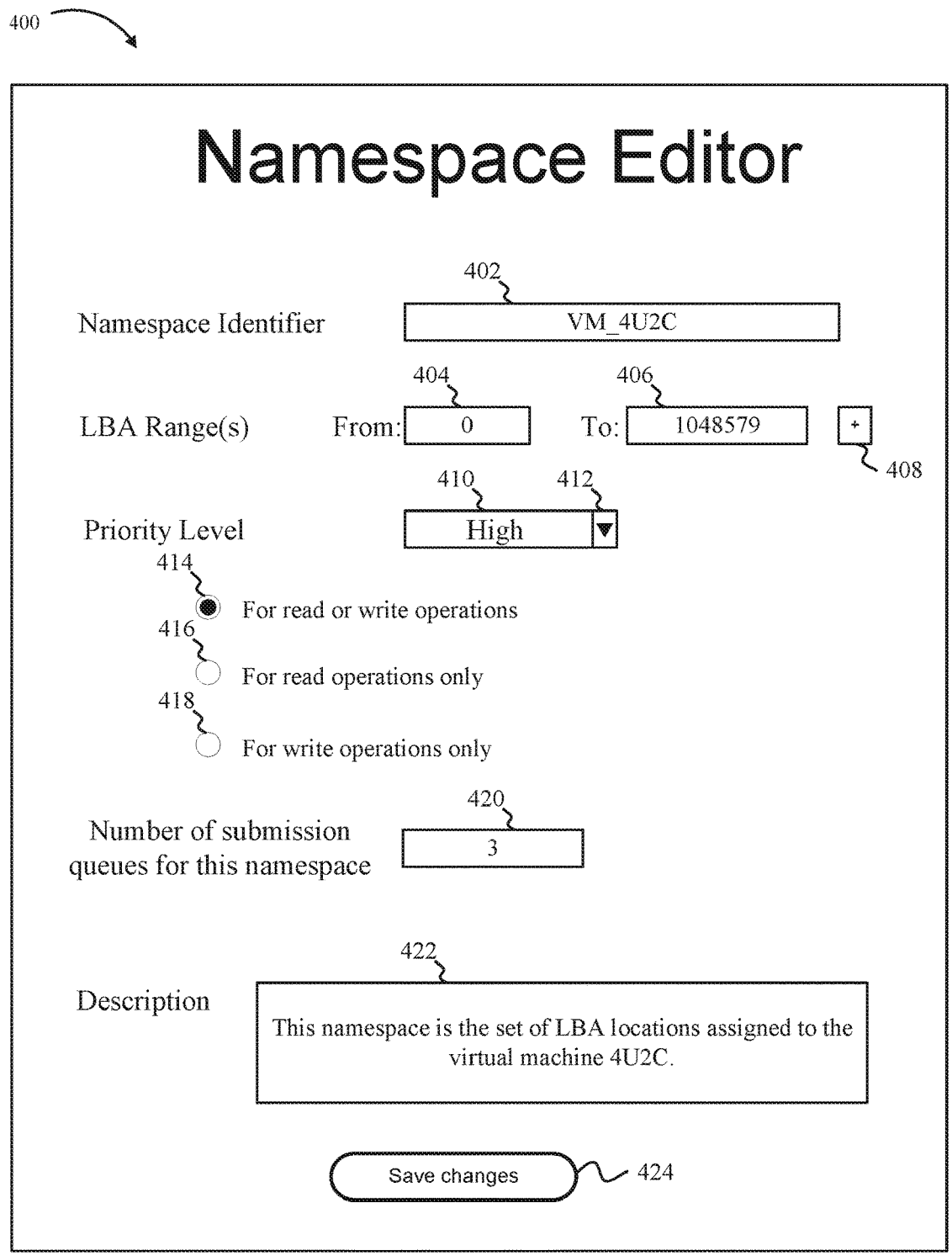
FIG. 4 illustrates an example mapping diagram for an HBA driver that allows a user to map logical block address (LBA) locations to namespaces and designate priority levels for queues that map to those namespaces, according to an example.

FIG. 4 illustrates an example mapping diagram 400 for an HBA driver that allows a user to map LBA locations to namespaces and designate priority levels for queues that map to those namespaces, according to an example.

As shown, the mapping diagram 400 includes a field 402 where a user can enter an identifier for a namespace. In addition, the mapping diagram 400 includes a field 404 where the user can indicate a starting LBA for an LBA range included in the namespace and a field 406 where the user can indicate an ending LBA for the LBA range. If the namespace includes additional LBA ranges, the user can click on the button 408 to reveal additional fields for specifying the additional ranges in a similar fashion.

The mapping diagram 400 also includes a field 410 that displays a priority level associated with the namespace. The user can click on the arrow 412 to reveal a drop-down list that displays the possible values for the priority level (e.g., "low," "medium," or "high"). With regard to the priority level, the user can select radio buttons 414, radio button 416, or radio button 418 to indicate the types of I/O commands to which the priority level indicated in field 410 applies. For example, if radio button 414 is selected as shown, both read commands and write commands that target the LBA range indicated by fields 404-406 will be routed to queues with the priority level indicated in field 414. If radio button 416 is selected, the priority level will only apply to read commands that target the LBA range. Similarly, if radio button 418 is selected, the priority level will only apply to write commands that target the LBA range. Also, if radio button 416 or radio button 418 is selected, an additional field that allows the user to specify an additional priority level may be revealed. For example, if radio button 416 is selected, the additional priority level specified in the additional field may apply to write commands.

The mapping diagram 400 also includes a field 420 in which the user can specify the number of submission queues that map to the namespace. The number of submission queues may represent the number of queues the user expects to be sufficient, but the HBA driver may also create supplementary queues in excess of the number shown in field 420 if additional space is ever needed to store requested I/O commands.

The mapping diagram 400 also includes a field 422 in which a user can enter a textual description of the namespace. For example, the user may specify a virtual machine or another construct to which the namespace maps.

Button 424 allows the user to save a newly defined namespace or update the characteristics of an existing namespace based on the inputs provided through the mapping diagram 400. When a new namespace is created, the HBA driver generates queues with the specified priority level for the namespace and updates (or generates) a table to reflect that the queues map to the namespace. When an existing namespace is updated, the HBA driver updates the table to reflect the changes and updates the queues that map to the namespace accordingly (e.g., by adding or deleting queues or by changing queue priority levels).

While the mapping diagram 400 is provided for illustrative purposes, an HBA driver may use many different interface variations without departing from the spirit and scope of this disclosure. For example, a command-line interface or a graphical user interface (GUI) with a different format, different elements, or different labels from those shown in mapping diagram 400 may be used.

Figure 5:
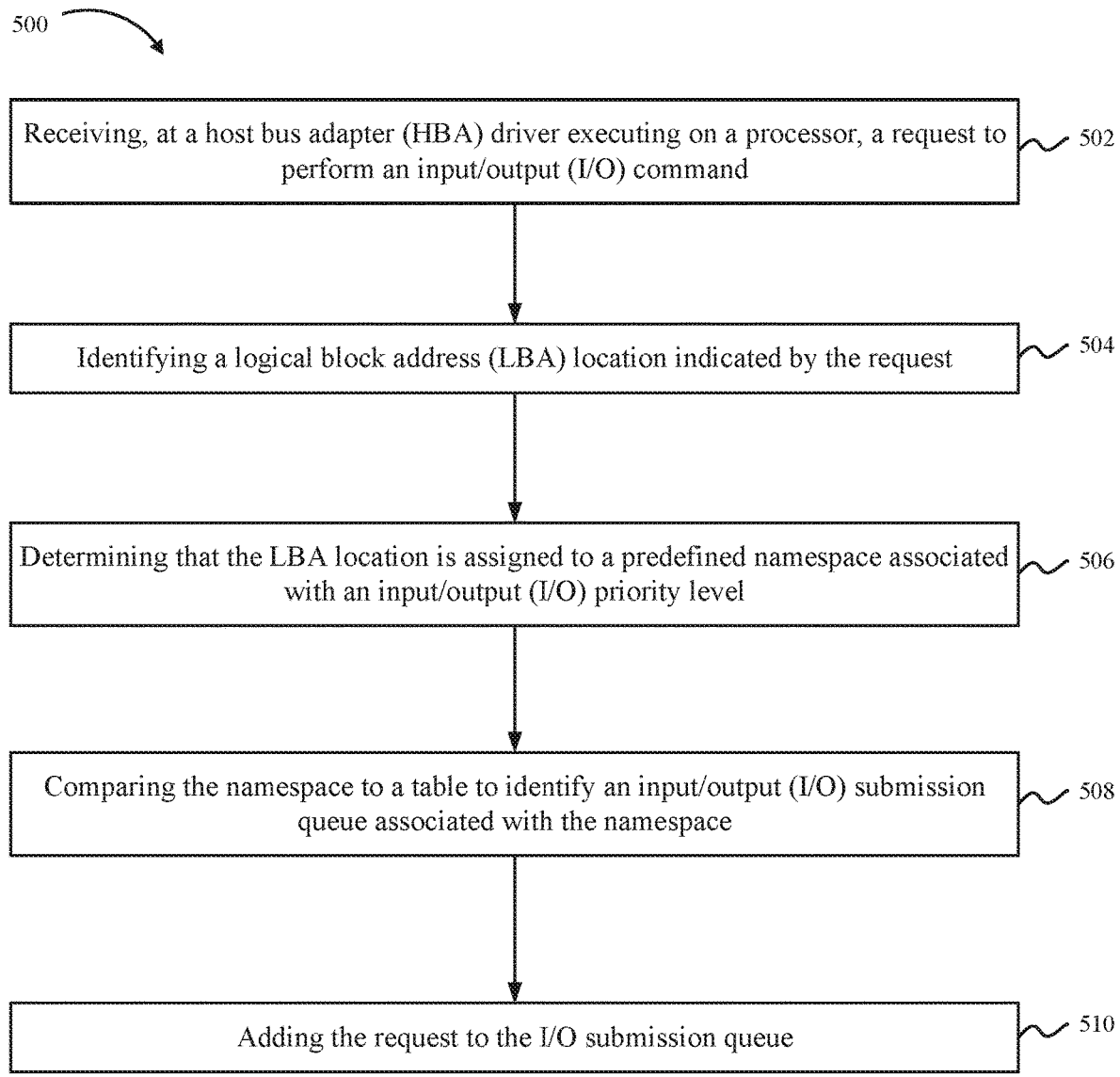
FIG. 5 illustrates a process for an HBA driver, according to one example.

FIG. 5 illustrates functionality 500 for an HBA driver as described herein, according to one example. The functionality 500 may be implemented as a method or can be executed as instructions on a machine (e.g., by one or more processors), where the instructions are included on at least one computer-readable storage medium (e.g., a transitory or non-transitory computer-readable storage medium). While only five blocks are shown in the functionality 500, the functionality 500 may include other actions described herein.

As shown in block 502, the functionality 500 includes receiving, at an HBA driver executing on a processor, a request to perform an I/O command. The request may conform to an NVMe standard (e.g., NVM Express Revision 1.3 or a later revision). The request may be received from an application running inside a virtual machine that executes at least partly on a server that includes the processor. The namespace may be a logical group of LBA locations on a non-volatile storage medium that are assigned to the virtual machine or an operating-system-level partition.

The functionality 500 may also include, prior to receiving the request, receiving user input (via a user interface of the HBA driver) that specifies an identifier for the namespace, a range of LBA locations that are assigned to the namespace (wherein the range includes the LBA location), and the priority level associated with the namespace. Furthermore, the user input may also specify LBA ranges within the namespace that are marked as critical data that is frequently used. If a requested I/O command targets one of the LBA ranges that is marked as critical, the HBA driver routes that command to a high-priority queue.

In one example, the I/O command is a write command and the user input also specifies that: the priority level applies to write commands that target LBA locations assigned to the namespace; and a second priority level applies to read commands that target LBA locations assigned to the namespace, wherein the second priority level is lower than the priority level that applies to write commands that target LBA locations assigned to the namespace.

The functionality 500 may also include receiving, via the user interface, an updated priority level for the namespace; associating the namespace with the updated priority level; and, without halting the HBA driver and without halting an application from which the request originated, reconfiguring the I/O submission queue to be associated with the updated priority level.

As shown in block 504, the functionality 500 includes identifying an LBA location indicated by the request.

As shown in block 506, the functionality 500 includes determining that the LBA location is assigned to a predefined namespace associated with an I/O priority level.

As shown in block 508, the functionality 500 includes comparing the namespace to a table to identify an I/O submission queue associated with the namespace. The priority level associated with the namespace applies to the I/O submission queue.

As shown in block 510, the functionality 500 includes adding the I/O command to the I/O submission queue. For example, the I/O command may comprise an opcode (OPC) for the requested command, whether the requested command is part of a fused operation (FUSE), the position of the requested command in a sequence of commands that makes up the FUSE, a physical region page (PRP) or a scatter gather list (SGL) for Data Transfer (PSDT), and a command identifier (CID) that specifies a unique identifier for the requested command when combined with a submission queue identifier. The functionality 500 may also include performing the I/O command.

Further, the functionality 500 may include receiving, at the HBA driver executing on the processor, a second request to perform a second I/O command, wherein the second I/O command is a read command; identifying a second LBA location indicated by the second request; determining that the second LBA location is assigned to the namespace; comparing the namespace to the table to identify a second I/O submission queue associated with the namespace, wherein the second priority level applies to the second I/O submission queue; and adding the second I/O command to the second I/O submission queue.

The functionality 500 may also include receiving, at the HBA driver, an additional request to perform an additional I/O command; identifying an additional LBA location indicated by the additional request; determining that the additional LBA location is assigned to the namespace associated with the priority level; determining that the I/O submission queue associated with the namespace is full; generating a supplementary I/O submission queue associated with the namespace, wherein the priority level associated with the namespace applies to the supplementary I/O submission queue; and adding the additional I/O command to the supplementary I/O submission queue.

In addition, the functionality 500 may include detecting that the I/O submission queue is no longer full after adding the additional I/O command to the supplementary I/O submission queue; moving the additional request from the supplementary I/O submission queue to the I/O submission queue; and deleting the supplementary I/O queue.

In one example, after the request discussed in block 502 (the first request) is received, a second request may be received before the I/O command (the first I/O command) discussed on block 502 is executed by firmware at the controller. The second request may specify a second I/O command. The functionality 500 may also include receiving, at the HBA driver, the second request to perform the second I/O command. Instead of targeting the LBA location discussed in block 504 (the first LBA location) or the namespace discussed in block 506 (the first namespace), the second I/O command may target a second LBA location within a second namespace. The second namespace may have a second priority level that is lower than the priority level of the first namespace (the first priority level). The functionality 500 may also include identifying the second LBA location indicated by the second request and determining that the second LBA location is assigned to the second namespace (which is associated with the second priority level). Next, the functionality 500 may include comparing the second namespace to the table to identify a second I/O submission queue associated with the second namespace. The second priority level applies to the second I/O submission queue. The functionality 500 may also include adding the second I/O command to the second I/O submission queue. Since the second I/O submission queue has a lower priority than the first I/O submission queue, any commands in the first I/O submission queue will be executed before commands in the second I/O submission queue. Accordingly, the first I/O command (along with any other commands in high-priority queues) is executed by the firmware before the second I/O command (e.g., subject to an arbitration mechanism). The firmware may, after executing the first I/O command, and upon verifying that the first I/O submission queue is empty and that no other requests are waiting in any other I/O submission queue to which the first priority level applies, execute the second I/O command.

In a different example, after the request discussed in block 502 (the first request) is received at the HBA driver, a second request may be received at the HBA driver before the I/O command (the first I/O command) discussed on block 502 is executed by firmware at the controller. The second request may specify a second I/O command. Further, the functionality 500 may include receiving, at the HBA driver, the second request to perform the second I/O command. Instead of targeting the LBA location discussed in block 504 (the first LBA location) or the namespace discussed in block 506 (the first namespace), the second I/O command may target a second LBA location within a second namespace. The second namespace may have a second priority level that is higher than the priority level of the first namespace (the first priority level). The functionality 500 may also include identifying the second LBA location indicated by the second request and determining that the second LBA location is assigned to the second namespace (which is associated with the second priority level). Next, the functionality 500 may include comparing the second namespace to the table to identify a second I/O submission queue associated with the second namespace. The second priority level applies to the second I/O submission queue. The functionality 500 may also include adding the second I/O command to the second I/O submission queue. Since the second I/O submission queue has a higher priority than the first I/O submission queue, any commands in the second I/O submission queue will be executed by the firmware before commands in the first I/O submission queue. Accordingly, the second I/O command (along with any other commands in high-priority queues) is executed by the firmware before the first I/O command (e.g., subject to an arbitration mechanism). Hence, the firmware may execute the second I/O command before executing the first I/O command.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

What is claimed is:

1. A method comprising:
   receiving, at a host bus adapter (HBA) driver executing on a processor, a request to perform an input/output (I/O) command;
   identifying a logical block address (LBA) location indicated by the request;
   determining that the LBA location is assigned to a predefined namespace associated with an input/output (I/O) priority level;
   comparing the namespace to a table to identify an input/output (I/O) submission queue associated with the namespace, wherein the priority level associated with the namespace applies to the I/O submission queue; and
   adding the I/O command to the I/O submission queue.

2. The method of claim 1, further comprising:
   prior to receiving the request, receiving, via a user interface of the HBA driver, user input that specifies:
   an identifier for the namespace;
   a range of LBA locations that are assigned to the namespace, wherein the range includes the identified LBA location; and
   the priority level associated with the namespace.

3. The method of claim 2, wherein the I/O command is a write command, and wherein the user input also specifies that:
   the priority level applies to write commands that target LBA locations assigned to the namespace; and
   a second priority level applies to read commands that target LBA locations assigned to the namespace, wherein the second priority level is lower than a priority level that applies to write commands that target LBA locations assigned to the namespace.

4. The method of claim 3, further comprising:
   receiving, at the HBA driver executing on the processor, a second request to perform a second I/O command, wherein the second I/O command is a read command;
   identifying a second LBA location indicated by the second request;
   determining that the second LBA location is assigned to the namespace;
   comparing the namespace to the table to identify a second I/O submission queue associated with the namespace, wherein the second priority level applies to the second I/O submission queue; and
   adding the second I/O command to the second I/O submission queue.

5. The method of claim 2, further comprising:
   receiving, via the user interface, an updated priority level for the namespace;

associating the namespace with the updated priority level; and without halting the HBA driver and without halting an application from which the request originated, reconfiguring the I/O submission queue to be associated with the updated priority level.

6. The method of claim 1, wherein the request is received from an application running inside a virtual machine, wherein the virtual machine executes at least partly on a server that includes the processor.

7. The method of claim 6, wherein the namespace is a logical group of LBA locations on a non-volatile storage medium that are assigned to the virtual machine.

8. The method of claim 1, further comprising:
receiving, at the HBA driver, an additional request to perform an additional I/O command;
identifying an additional LBA location indicated by the additional request;
determining that the additional LBA location is assigned to an additional predefined namespace associated with an additional priority level that is lower than the priority level;
comparing the additional namespace to the table to identify an additional I/O submission queue associated with the additional namespace, wherein the additional priority level associated with the additional namespace applies to the additional I/O submission queue;
adding the additional I/O command to the additional I/O submission queue; and
after executing the I/O command, and upon verifying that the I/O submission queue is empty and that no other requests are waiting in any other I/O submission queue to which the priority level applies, executing the additional I/O command after the additional request reaches a first position in the additional I/O submission queue.

9. The method of claim 1, further comprising:
receiving, at the HBA driver, an additional request to perform an additional I/O command;
identifying an additional LBA location indicated by the additional request;
determining that the additional LBA location is assigned to the namespace associated with the priority level;
determining that the I/O submission queue associated with the namespace is full;
generating a supplementary I/O submission queue associated with the namespace, wherein the priority level associated with the namespace applies to the supplementary I/O submission queue; and
adding the additional I/O command to the supplementary I/O submission queue.

10. The method of claim 9, further comprising:
detecting that the I/O submission queue is no longer full after adding the additional I/O command to the supplementary I/O submission queue;
moving the additional I/O command from the supplementary I/O submission queue to the I/O submission queue; and
deleting the supplementary I/O queue.

11. The method of claim 1, further comprising:
receiving, at the HBA driver, an additional request to perform an additional I/O command;
identifying an additional LBA location indicated by the additional request;
determining that the additional LBA location is assigned to an additional predefined namespace associated with an additional priority level that is higher than the priority level;
comparing the additional namespace to the table to identify an additional I/O submission queue associated with the additional namespace, wherein the additional priority level associated with the additional namespace applies to the additional I/O submission queue;
adding the additional I/O command to the additional I/O submission queue; and
before executing the I/O command, executing the additional I/O command.

12. The method of claim 1, further comprising performing the I/O command.

13. The method of claim 1, wherein the namespace is an operating-system-level partition.

14. A non-transitory computer-readable storage medium containing instructions thereon that, when executed on a processor, perform the following:
receiving, at a host bus adapter (HBA) driver executing on the processor, a request to perform an input/output (I/O) command;
identifying a logical block address (LBA) location indicated by the request;
determining that the LBA location is assigned to a predefined namespace associated with an input/output (I/O) priority level;
comparing the namespace to a table to identify an input/output (I/O) submission queue associated with the namespace, wherein the priority level associated with the namespace applies to the I/O submission queue; and
adding the I/O command to the I/O submission queue.

15. The non-transitory computer-readable medium of claim 14, further comprising instructions thereon that, when executed on the processor, perform the following:
prior to receiving the request, receiving, via a user interface of the HBA driver, user input that specifies:
an identifier for the namespace;
a range of LBA locations that are assigned to the namespace, wherein the range includes the identified LBA location; and
the priority level associated with the namespace.

16. The non-transitory computer-readable medium of claim 14, wherein the request is received from an application running inside a virtual machine that is executing at least partly on a server that includes the processor.

17. The non-transitory computer-readable medium of claim 16, wherein the namespace is a logical group of LBA locations on a non-volatile storage medium that are assigned to the virtual machine.

18. A system comprising:
one or more processors; and
a memory storing instructions that, when executed on the one or more processors, perform a set of actions, the set of actions comprising:
receiving, at a host bus adapter (HBA) driver executing on the one or more processors, a request to perform an input/output (I/O) command;
identifying a logical block address (LBA) location indicated by the request;
determining that the LBA location is assigned to a predefined namespace associated with an input/output (I/O) priority level;
comparing the namespace to a table to identify an input/output (I/O) submission queue associated with the namespace, wherein the priority level associated with the namespace applies to the I/O submission queue; and
adding the I/O command to the I/O submission queue.

19. The systems of claim 18, wherein the set of actions further comprises:

prior to receiving the request, receiving, via a user interface of the HBA driver, user input that specifies:
an identifier for the namespace;
a range of LBA locations that are assigned to the namespace, wherein the range includes the identified LBA location; and
the priority level associated with the namespace.

20. The system of claim 18, wherein the request is received from an application running inside a virtual machine that is executing at least partly on a server that includes the one or more processors.

\* \* \* \* \*